(12) United States Patent
Suzuki et al.

(10) Patent No.: US 8,202,616 B2
(45) Date of Patent: Jun. 19, 2012

(54) DARK COLOR SHEET-LIKE BODY HAVING LIGHT REFLECTION PROPERTIES IN NEAR-INFRARED REGION

(75) Inventors: Takuo Suzuki, Ashikaga (JP); Yoshiaki Shimizu, Kitakatsushika-gun (JP); Makiko Sakurazawa, Ashikaga (JP)

(73) Assignee: Achilles Corporation, Tokyo (JP)

( * ) Notice: Subject to any disclaimer, the term of this patent is extended or adjusted under 35 U.S.C. 154(b) by 596 days.

(21) Appl. No.: 12/227,985

(22) PCT Filed: May 31, 2007

(86) PCT No.: PCT/JP2007/061120
§ 371 (c)(1),
(2), (4) Date: Dec. 4, 2008

(87) PCT Pub. No.: WO2007/145083
PCT Pub. Date: Dec. 21, 2007

(65) Prior Publication Data
US 2009/0268278 A1    Oct. 29, 2009

(30) Foreign Application Priority Data

Jun. 16, 2006   (JP) ................................ 2006-167988

(51) Int. Cl.
*B32B 7/02* (2006.01)
*B32B 27/00* (2006.01)
*B32B 27/20* (2006.01)

(52) U.S. Cl. .................. 428/411.1; 428/423.1; 428/522

(58) Field of Classification Search .................. 359/361; 428/409, 411.1, 423.1, 522
See application file for complete search history.

(56) References Cited

U.S. PATENT DOCUMENTS

| 7,592,066 | B2 * | 9/2009 | Shiao et al. ................. 428/411.1 |
| 7,632,568 | B2 * | 12/2009 | Padiyath et al. .............. 428/328 |
| 7,749,593 | B2 * | 7/2010 | Kalkanoglu et al. .......... 428/212 |
| 2004/0018360 | A1 | 1/2004 | Hugo |
| 2004/0190143 | A1 | 9/2004 | Harasawa et al. |
| 2004/0191540 | A1 * | 9/2004 | Jakobi et al. .................. 428/457 |
| 2007/0290172 | A1 * | 12/2007 | Momose et al. ......... 252/301.16 |
| 2010/0047620 | A1 * | 2/2010 | Decker et al. ................. 428/688 |

FOREIGN PATENT DOCUMENTS

| JP | A-05-280269 | 10/1993 |
| JP | A-08-081567 | 3/1996 |
| JP | A-10-250002 | 9/1998 |
| JP | A-11-048437 | 2/1999 |
| JP | A-2002-012679 | 1/2002 |
| JP | A-2002-060698 | 2/2002 |
| JP | A-2004-505808 | 2/2004 |
| JP | A-2004-314596 | 11/2004 |

OTHER PUBLICATIONS

Office Action from Japanese Patent Application No. JP 2008-521147 mailed Dec. 2, 2011, with English-language translation.

* cited by examiner

*Primary Examiner* — Mark Consilvio
(74) *Attorney, Agent, or Firm* — Oliff & Berridge, PLC

(57) ABSTRACT

A dark color, resin sheet-like body having light reflective properties in a near-infrared region, the body comprising a surface layer (A) receiving solar radiation and a reflection layer (B). Surface layer (A) exhibits a dark color with a solar radiation absorption ratio of 90% or more in a wavelength region of 380 to 720 nm, a ratio of less than 30% in a near-infrared region of 720 to 1500 nm, and ratio of 50% or more in a near-infrared region of 720 to 1500 nm. Reflection layer (B) has a solar radiation reflection ratio of 85% or more in a wavelength region of 380 to 1500 nm. A ratio in a near-infrared region of 720 to 1500 nm of a sheet-like body formed by laminating surface layer (A) and reflection layer (B) is 70% or more.

5 Claims, No Drawings

DARK COLOR SHEET-LIKE BODY HAVING LIGHT REFLECTION PROPERTIES IN NEAR-INFRARED REGION

TECHNICAL FIELD

The present invention relates to a dark color sheet-like body having light reflection properties in a near-infrared region, the dark color sheet-like body being usable for: vehicle interior parts such as an instrument panel for a vehicle, a door trim, a glove compartment, a steering wheel, a seat surface material, and a tonneau cover (a trunk cover); furniture such as a seat surface of a bench installed in stations, bus stops, airports, baseball stadiums and soccer stadiums or the like; or membrane structures such as a tent, an awning and a truck tarp, and also relates to a structure utilizing the dark color sheet-like body.

BACKGROUND OF THE INVENTION

Since interior parts of vehicles such as automobiles, in particular an instrument panel, are located in front of a driver, it is not preferable that light in the visible region is reflected by the interior parts, thus dazzling the driver, because this may exert a harmful influence on driving. From such a standpoint, a dark color such as black is generally used for an instrument panel in an automobile. However, these dark color parts generally used also absorb light in the near-infrared region in addition to light in the visible region at the same time, so that temperature in an automobile rises due to the heating of the surfaces of these dark color parts. In addition, this temperature rise in an automobile leads to use of air conditioner, resulting in poor fuel efficiency. Such temperature rise in a vehicle caused by sunlight is a problem arising not only in an instrument panel but also in all dark color vehicle interior parts.

In ball stadiums such as baseball stadiums and soccer stadiums, a bench seat surface with a color reflecting light in the visible region is not preferable. In addition, with respect to membrane materials used for a tent, an awning, a truck tarp, and the like, the membrane materials which reflect light in the visible region are not preferable in some cases because such membrane materials are dazzling human eyes. Thus, dark color materials are used for these applications, but these materials have a problem of temperature rising of the surface thereof as described above.

Incidentally, a technique providing a film or a sheet having heat shielding properties has been used in the past, and, for example, Japanese Patent Application Publication No. Hei 8-81567 (Document 1) discloses a sheet having heat shielding properties by containing a specific amount of an aluminum compound or a diimonium compound in a plastic resin. In addition, Japanese Patent Application Publication No. Hei 10-250002 (Document 2) discloses a film for outdoor spreading use which has heat shielding properties enhanced by providing a layer containing fine particles of an inorganic oxide doped with a metal on one surface of a thermoplastic resin film and further providing a layer containing hydrophilic inorganic colloidal particles. Moreover, Japanese Patent Application Publication No. 2002-12679 (Document 3) discloses a heat shielding color film formed by mixing two or more pigments having heat shielding properties in a thermoplastic resin film.

Sheets and films described in Document 1 and 2 are translucent, and are preferably used for applications which need transparency, such as lamination to a glass window. However, these sheets and films are not preferable for a dark color sheet-like body as of the present invention. In addition, a sheet as described in Document 3 can be colored, but this sheet has solar radiation reflection property in not only the near-infrared region but also the visible region, so that it is difficult to have both heat shielding properties and a dark color.

In addition, Japanese Patent Translation Publication No. 2004-505808 (Document 4) discloses a structural body not absorbing heat at its surface with a structure for absorbing light in the visible region but reflecting light in the near-infrared region.

Moreover, Japanese Patent Application Publication No. 2004-314596 (Document 5) discloses a colored sheet having light ray shielding properties, comprising at least a reflection layer and a colored layer laminated on an light-exposed side of the reflection layer, wherein the reflection layer has a solar radiation reflection ratio of 60% or more in a wavelength region of 780 to 1350 nm, and the colored layer has a light transmission ratio of 30% or more in a wavelength region of 780 to 1350 nm as well as having a solar radiation absorption ratio of 10 to 80% in a wavelength region of 380 to 780 nm. However, since the colored layer of the sheet described in Document 5 has a wide solar radiation absorption ratio of 10 to 80% in a wavelength region of 380 to 780 nm, relatively flexible coloring was possible, but a sheet with a dark color could not be obtained.

DISCLOSURE OF THE INVENTION

The present invention has been made in consideration of the above-described problems in the conventional techniques. An object of the present invention is to provide a dark color sheet-like body having a solar radiation absorption ratio of 90% or more in a visible region of 380 to 720 nm, and having excellent heat shielding properties.

A wavelength region of 720 to 1500 nm is generally represented as the near-infrared region and it is generally said that light in this wavelength region is easily converted into heat. By suppressing absorption of light in this wavelength region, heat ray is not absorbed, so that heat generation at a surface is suppressed. Therefore, the inventors of the present invention have investigated how light in this wavelength region can be not absorbed but reflected. However, the inventors of the present invention have found that it is difficult to find out a material having a high solar radiation absorption ratio in the visible region and having a high solar radiation reflection ratio in the near infrared region, and that it is difficult to obtain a single layer sheet exhibiting a dark color and having suppressed absorption of light in the near-infrared region. Then, the present inventors have earnestly studied in order to solve the above problems. As a result, the inventors have revealed that a dark color sheet-like body having excellent heat shielding properties is obtained by providing a surface layer having a solar radiation absorption ratio of 90% or more in a visible region of 380 to 720 nm and a solar radiation transmission ratio of 50% or more in a near-infrared region of 720 to 1500 nm onto a surface of a reflection layer having a very high solar radiation reflection ratio of 85% or more in a wavelength region of 380 to 1500 nm. This discovery has led the inventors to complete the present invention.

Specifically, the dark color sheet-like body having light reflective properties in a near-infrared region according to the present invention is a synthetic resin sheet-like body and comprises a surface layer (A) receiving solar radiation and a reflection layer (B). In the dark color sheet-like body, the surface layer (A) is a layer exhibiting a dark color, and having a solar radiation absorption ratio of 90% or more in a wavelength region of 380 to 720 nm, a solar radiation absorption ratio of less than 30% in a near-infrared region of 720 to 1500 nm, and a solar radiation transmission ratio of 50% or more in a near-infrared region of 720 to 1500 nm, the reflection layer (B) is a layer having a solar radiation reflection ratio of 85% or more in a wavelength region of 380 to 1500 nm, and a solar radiation reflection ratio in a near-infrared region of 720 to 1500 nm of a sheet-like body formed by laminating the surface layer (A) and the reflection layer (B) is 70% or more.

In addition, for the dark color sheet-like body according to the present invention, each of the surface layer (A) and the reflection layer (B) is preferably formed of at least one synthetic resin selected from the group consisting of a polyvinyl chloride-based resin, a polyurethane-based resin and a thermoplastic elastomer-based resin.

Moreover, for a dark color sheet-like body according to the present invention, the surface layer (A) and the reflection layer (B) are preferably formed of the same synthetic resin.

In addition, for the dark color sheet-like body according to the present invention, the surface layer (A) preferably contains 100 parts by weight of a synthetic resin and 1 to 5 parts by weight of at least one pigment selected from the group consisting of an azo-based pigment, an azomethine azo-based pigment and a perylene-based pigment.

Moreover, for the dark color sheet-like body according to the present invention, the reflection layer (B) preferably contains 100 parts by weight of a synthetic resin and 3 to 75 parts by weight of a titanium oxide-based white pigment.

Furthermore, for the dark color sheet-like body according to the present invention, the reflection layer (B) preferably contains 100 parts by weight of synthetic resin, 3 to 75 parts by weight of titanium oxide-based white pigment and 5 to 20 parts by weight of at least one filler selected from the group consisting of glass beads, hollow glass balloons and microcapsules.

According to the present invention, it is possible to provide a dark color sheet-like body having light reflection properties in the near-infrared region, that is, having a solar radiation absorption ratio of 90% or more in a visible region of 380 to 720 nm and also excellent heat shielding properties. Although the dark color sheet-like body having light reflection properties in the near-infrared region of the present invention is a sheet-like body with a surface exhibiting a dark color due to absorption of light in the visible region, the dark color sheet-like body exhibits heat shielding properties similar to that of a sheet-like body with a light color such as white. Here, it is not known exactly why this can be achieved. However, the present inventors speculate as follows. A wavelength region of 380 to 720 nm is represented as the visible region, and the light within this region can be detected by naked eye of a human. In addition, when a sheet-like body has a high absorption ratio of light in the visible region (for example, an absorption ratio of 90% or more), the sheet-like body exhibits a dark color. Moreover, it is generally said that light in the near-infrared region is easily converted into heat. Therefore, if only absorption of light in the near-infrared region in the sunlight is suppressed, that is, if light in the near-infrared region is transmitted or reflected, heat generation at the surface is suppressed even though the sheet-like body exhibits a dark color. In addition, the dark color sheet-like body having light reflection properties in the near-infrared region of the present invention is a sheet-like body laminating a surface layer having a solar radiation absorption ratio of 90% or more in a visible region of 380 to 720 nm and a solar radiation transmission ratio of 50% or more in a near-infrared region of 720 to 1500 nm onto a surface of a reflection layer having an extremely high solar radiation reflection ratio of 85% or more in a wavelength region of 380 to 1500 nm. When the sunlight is incident on such a sheet-like body, the light in the visible region in the sunlight is absorbed in high ratio by a surface layer (A) and the light having been transmitted through the surface layer (A) is reflected by a reflection layer (B), and further the reflected light is absorbed in high ratio by the surface layer (A). Consequently, the sheet-like body of the present invention becomes a dark color body. In addition, since such an absorbed light in the visible region is hardly converted into thermal energy, this absorption hardly affects the heat shielding properties of the sheet-like body. In contrast, while easily converted into thermal energy when irradiated to an object, light in the near-infrared region in the sunlight is hardly absorbed by the surface layer (A) and is transmitted through the surface layer (A). In addition, the light having been transmitted through the surface layer (A) is reflected by the reflection layer (B). Moreover, the reflected light is hardly absorbed by the surface layer (A) and is transmitted through the surface layer (A). Accordingly, the light is released to the outside. Thus, the inventors of the present invention speculate that because of the above descried reasons, the sheet-like body of the present invention has excellent heat shielding properties similar to that of a sheet-like body with a light color such as white although the surface of the sheet-like body has a dark color.

DETAILED DESCRIPTION OF THE PREFERRED EMBODIMENTS

The dark color sheet-like body having light reflection properties in the near-infrared region according to the present invention will be further described below, along with its preferred embodiments.

A dark color sheet-like body having light reflection properties in the near-infrared region according to the present invention is a synthetic resin sheet-like body and comprises a surface layer (A) receiving solar radiation and a reflection layer (B). In the dark color sheet-like body, the surface layer (A) is a layer exhibiting a dark color, and having a solar radiation absorption ratio of 90% or more in a wavelength region of 380 to 720 nm, a solar radiation absorption ratio of less than 30% in a near-infrared region of 720 to 1500 nm, and a solar radiation transmission ratio of 50% or more in a near-infrared region of 720 to 1500 nm, the reflection layer (B) is a layer having a solar radiation reflection ratio of 85% or more in a wavelength region of 380 to 1500 nm, and a solar radiation reflection ratio in a near-infrared region of 720 to 1500 nm of a sheet-like body formed by laminating the surface layer (A) and the reflection layer (B) is 70% or more.

The surface layer (A) and the reflection layer (B) according to the present invention are layers each containing at least one synthetic resin selected from the group consisting of a polyvinyl chloride-based resin, a polyolefin-based resin, an acrylic-based resin, a polyurethane-based resin and a thermoplastic elastomer-based resin made of any of these resins. Among these synthetic resins, from the viewpoint of texture, light resistance and processability, a polyvinyl chloride-based resin, a polyurethane-based resin and a thermoplastic elastomer-based resin are preferable. In addition, although such a surface layer (A) and a reflection layer (B) may be made of different synthetic resins, these layers are preferably made of the same synthetic resin from the viewpoint of adhesion and recyclability. When the surface layer (A) and the reflection layer (B) are made of the same synthetic resin as described above, a sheet-like body having excellent adhesion can be obtained without laying an adhesive layer. In addition, in the sheet-like body without an adhesive layer as described above, texture of the dark color sheet-like body is not impaired, and the problem of delamination is reduced. Furthermore, heat shielding properties of the dark color sheet-like body is not impaired. In addition, it is advantageous that the surface layer (A) and the reflection layer (B) are made of the same synthetic resin as described above, because the laminated sheets can be recycled without separation.

Examples of structures of the dark color sheet-like body of the present invention include, for example, so-called "PVC leather" having a structure in which both the surface layer (A) and the reflection layer (B) are made of a polyvinyl chloride-based resin and in which a fabric substrate (raw fabric) is laminated on a back surface of a reflection layer (B), and so-called "urethane leather" having a structure in which both the surface layer (A) and the reflection layer (B) are made of polyurethane-based resin and in which the reflection layer (B) is made by impregnating a fabric substrate itself with a polyurethane-based resin. Moreover, both the surface layer (A) and the reflection layer (B) may be made of so-called thermoplastic elastomer-based resin which has both properties of plastic and rubber.

In addition, the surface layer (A) and the reflection layer (B) according to the present invention can be formed with a formulated composition containing synthetic resins according to the present invention.

When a polyvinyl chloride-based resin is used as the synthetic resin according to the present invention, the same of polyvinyl chloride-based resin is desirably used for both the surface layer (A) and the reflection layer (B). Examples of such a polyvinyl chloride-based resin used herein include a homopolymer of vinyl chloride monomer, a copolymer of vinyl chloride monomer with a monomer copolymerizable with vinyl chloride monomer, such as vinyl acetate monomer and acrylonitrile monomer. A polymerizing method of these polyvinyl chloride-based resins is not particularly limited. However, an emulsion polymerization method whose product results in a paste plastisol when blended with a plasticizer is particularly preferably used, but other methods such as a micro-suspension polymerization method, a soap-free emulsion polymerization method and a suspension polymerization method can also be used.

In addition, when a polyvinyl chloride-based resin is used as the synthetic resin, a plasticizer may be further added to the formulated composition. For such a plasticizer, a compound used for common polyvinyl chloride-based resins may be used. Examples used herein include phthalate ester-based plasticizers such as di-2-ethylhexyl phthalate (DEHP), diisononyl phthalate (DINP), diisodecyl phthalate (DIDP), dibutyl phthalate (DBP), diundecyl phthalate (DUP) and butyl benzyl phthalate (BBP); trimellitate ester-based plasticizers such as trioctyl trimellitate (TOTM); aliphatic carboxylic acid ester-based plasticizers such as dioctyl adipate (DOA), dioctyl sebacate (DOS) and dioctyl azelate (DOZ); and polyester-based plasticizers such as polypropylene adipate.

Moreover, although an added amount of such a plasticizer is not particularly limited, the added amount is preferably in a range of 25 to 150 parts by weight, and more preferably 60 to 100 parts by weight, per 100 parts by weight of a polyvinyl chloride-based resin. If the plasticizer is too little, a sol viscosity of the paste plastisol is high, so that it tends to be difficult to coat the paste plastisol and to obtain an excellent quality sheet. In contrast, when the plasticizer is too much, since a sheet itself becomes too soft, the sheet is softened when use and tends to be deteriorated in heat stability.

In addition, when a polyvinyl chloride-based resin is used as the synthetic resin, a stabilizer commonly used for a polyvinyl chloride-based resin is preferably added if necessary to the formulated composition. Specifically, metal-containing stabilizers such as Ba—Zn, Ca—Zn and zinc oxide stabilizers can be widely used. Moreover, an ultraviolet absorber such as a hindered amine-based compound, a benzotriazole-based compound and a benzothiazole-based compound, and an antioxidant may be added to the formulated composition. Furthermore, in order to improve processability, various additives such as a viscosity reducing agent or a viscosity increasing agent may be added.

When a polyurethane-based resin is used as the synthetic resin according to the present invention, the same of polyurethane-based resin is desirably used for both the surface layer (A) and the reflection layer (B). For such a polyurethane-based resin, a resin having so-called urethane bond in a polymer made of a polyol component and an isocyanate component can be used. For example, a polyester-based polyurethane, a polyether-based polyurethane, a polycaprolacton-based polyurethane, a polyester/polyether copolymer polyurethane, a polyamino acid/polyurethane copolymer resin or a mixture thereof can be used.

In addition, when a polyurethane-based resin is used as the synthetic resin, from the viewpoint of application that is particularly likely to require exposure of the sheet-like body to direct sunlight, a polyurethane-based resin having excellent light resistance is particularly preferably used. In particular, a non-yellowing type polycarbonate-based polyurethane obtained by reacting a polycarbonate diol component, a non-yellowing type diisocyanate component and a low-molecular weight chain elongation agent is preferably used. For a polycarbonate diol component, for example, an aliphatic diisocyanate, an alicyclic diisocyanate, an aliphatic diisocyanate having cyclic groups or the like can be used, and, in particular, isophorone diisocyanate or a mixture of isophorone diisocyanate, as a main component, and at least one selected from the group consisting of cyclohexyl diisocyanate and dicyclohexylmethane diisocyanate is preferably used.

In addition, for the low-molecular weight chain elongation agent, compounds having two or more active hydrogen atoms such as an aliphatic diol, an alicyclic diol, an aliphatic diamine and a hydrazine derivative are used. A polyurethane-based resin polymerized as described above is dissolved into common organic solvents, specifically, methanol, ethanol, isopropanol, butanol, toluene, xylene, methyl ethyl ketone, methyl/n-propyl ketone, methyl isobutyl ketone, diethyl ketone, tetrahydrofuran, methyl cellosolve, butyl cellosolve, cellosolve acetate, dimethylformamide, dimethylacetamide, dimethylsulfoxide, N-methylpyrrolidone, dioxane, cyclohexanone or the like or a mixture thereof to be used as a polyurethane solution.

Moreover, when a polyurethane-based resin is used as the synthetic resin, various additives such as an antioxidant, a light stabilizer, an antistatic agent and a flame retardant may be further added as needed to the formulated composition.

When a thermoplastic elastomer-based resin is used as the synthetic resin according to the present invention, the same type of thermoplastic elastomer-based resin is desirably used for both the surface layer (A) and the reflection layer (B). For such a thermoplastic elastomer-based resin, in particular, an olefin-based thermoplastic elastomer (so-called TPO) is preferably used. Specifically, the TPO is a substance obtained by partially dynamically-vulcanizing a polyolefin resin, an ethylene-α-olefin copolymer rubber and/or an ethylene-α-olefin/non-conjugated polyene copolymer rubber, and a propylene/ethylene copolymer and/or a propylene/1-butene copolymer. More specifically, the TPO is a resin obtained by mixing an olefin-based resin of mainly containing polypropylene, polyethylene or EPDM (ethylene-propylene terpolymer) with rubber components, and by dynamically-vulcanizing the mixture.

Moreover, when a thermoplastic elastomer-based resin is used as the synthetic resin, various additives such as an antioxidant, a light stabilizer, an antistatic agent and a flame retardant may be further added to the formulated composition as needed.

The reflection layer (B) according to the present invention is a layer containing pigments described bellow in addition to the synthetic resin and various additives as described above. In addition, such a reflection layer (B) needs to have a solar radiation reflection ratio of 85% or more in a wavelength region of 380 to 1500 nm. Such a reflection layer (B) with a solar radiation reflection ratio of 85% or more in a wavelength region of 380 to 1500 nm highly reflects the light having been transmitted through the surface layer (A). As a result, light reflection properties in the near-infrared region can be given to the sheet-like body. Therefore, according to the present invention, a sheet-like body having excellent heat shielding properties can be obtained. In addition, from the viewpoint of further improvement of light reflection properties in the near-infrared region, the solar radiation reflection ratio is preferably 90% or more. In order to improve light reflection properties in the near-infrared region, such a reflection layer (B) needs to have a high solar radiation reflection ratio not only in the near-infrared region, but also in a wavelength region of 380 to 720 nm. For example, If the reflection layer (B) has a low solar radiation reflection ratio (for example, less than 50%) in a wavelength region of 380 to 720 nm, it is difficult to obtain a high solar radiation absorption ratio (for example, 85% or more) in a near-infrared region of 720 to 1500 nm. In addition, If the reflection layer (B) has a high solar radiation reflection ratio in a wavelength region of 380 to 720 nm, the light in the visible region which is not sufficiently absorbed by the surface layer (A) is reflected by the reflection layer, and the light has a second opportunity to be absorbed by the surface layer (A), so that a sheet-like body with a very strong dark color can be obtained.

Examples of such a pigment include titanium oxide-based white pigments. For such titanium oxide-based white pigments, both a rutile type titanium oxide and an anatase type titanium oxide may be used. However, a rutile type titanium oxide is preferable. In addition, a primary particle diameter of such titanium oxide is preferably in the range of 200 nm to 1000 nm. Moreover, an added amount of the white pigment is preferably in the range of 3 to 75 parts by weight, more preferably in the range of 20 to 50 parts by weight per 100 parts by weight of the synthetic resin. If the added amount is less than 3 parts by weight, solar radiation reflection properties is weak in some cases. In contrast, if the added amount exceeds 75 parts by weight, not so much increase in solar radiation reflection properties is achieved, and the sheet-like body cause problems in mechanical properties in some cases instead. Such a titanium oxide-based white pigment may be formulated in a toner state formed by dispersing the pigment in a plasticizer and the like in advance.

In addition, the reflection layer (B) according to the present invention may be a layer further containing fillers such as glass beads, hollow glass balloons and microcapsules in addition to the above-mentioned synthetic resins, various additives and pigments. A particle diameter of such fillers is preferably in the range of 1 to 150 µm, more preferably in the range of 5 to 100 µm, and particularly preferably 8 to 80 µm. If the particle diameter exceeds 150 µm, workability at the time of preparing the composition or at the time of forming the composition into a sheet tends to be deteriorated. In contrast, if a filler having a particle diameter of less than 1 µm is added, it tends to be difficult to obtain a desired solar radiation reflection effect.

In addition, an added amount of such fillers is preferably in the range of 5 to 20 parts by weight, and more preferably in the range of 10 to 15 parts by weight per 100 parts by weight of the synthetic resin. If the added amount is less than 5 parts by weight, it tends to be difficult to obtain a sufficient solar radiation reflection effect. In contrast, if the added amount exceeds 20 parts by weight, it tends to be difficult to form a sheet. In addition, when glass beads or hollow glass balloons are used as the filler, a composition of glass, a specific gravity (a hollow ratio) and the like thereof do not matter, and various coupling treatment and the like may be performed for improving adhesion to a resin component. Moreover, when microcapsules are used as the filler, no particular limitation with regard to a composition of shell exists, and expandable-under-heating type and previously-expanded type ones can be used. Hollow type and bead type ones can also be used.

In addition, a formulated composition for forming such a reflecting layer (B) is obtained by homogeneously mixing, with a mulling machine such as a dissolver mixer, the above mentioned components each previously weighed. Moreover, such a formulated composition may be filtered, if necessary, to remove undispersed components and may be defoamed under reduced pressure to remove foams.

The surface layer (A) according to the present invention is a layer containing a special pigment as described bellow in addition to the above-mentioned synthetic resins and various additives. Moreover, such a surface layer (A) is a layer which exhibits a dark color due to absorption of light in the visible region and which allows transmission of light in the near-infrared region in a high ratio.

In other words, such a surface layer (A) needs to have a solar radiation absorption ratio of 90% or more in a visible region of 380 to 720 nm. When such a surface layer (A) has a solar radiation absorption ratio of 90% or more in a visible region of 380 to 720 nm, the sheet-like body according to the present invention exhibits a dark color due to substantial absorption of the light humans can detect, and prevents humans from being dazzled.

In addition, the solar radiation absorption ratio of such a surface layer (A) in a near-infrared region of 720 to 1500 nm needs to be less than 30% (preferably less than 10%). If the solar radiation absorption ratio is 30% or more, incident light is absorbed by the surface layer (A) before reaching the reflection layer (B), or the light reflected by the reflection layer (B) is absorbed by the surface layer (A) before reaching the outside of the surface layer (A). Accordingly, the sheet-like substrate stores heat.

Moreover, the solar radiation transmission ratio of such a surface layer (A) in a near-infrared region of 720 to 1500 nm needs to be 50% or more. In other words, for maintaining a solar radiation absorption ratio of less than 30% in a near-infrared region of 720 to 1500 nm, light in the near-infrared region needs to be reflected or transmitted. However, if the surface layer (A) is designed to reflect light in the near-infrared region, reflection occurs also in a visible region of 380 to 720 nm in some degree. As a result, it is difficult to obtain a sheet-like body with a dark color. Thus, in the present invention, the solar radiation transmission ratio of such a surface layer (A) in a near-infrared region of 720 to 1500 nm needs to be 50% or more.

In order to form such a surface layer (A), a special pigment which transmits light in the near-infrared region needs to be used. Examples of such a special pigment which transmits light in the near-infrared region include pigments such as an azo-based pigment, an anthraquinone-based pigment, a phthalocyanine-based pigment, a perynone-perylene-based pigment, an indigo-thioindigo-based pigment, a dioxane-based pigment, a quinacridone-based pigment, an isoindolinone-based pigment, an isoindoline-based pigment, a diketo-pyrrolopyrrole-based pigment, an azomethine-based pigment and an azomethine azo-based pigment. Of these special pigments, from the viewpoint of balance between absorption property of light in the visible region and transmission property of light in the near-infrared region, an azo-based pigment, an azomethine azo-based pigment and a perylene-based pigment are particularly preferable.

In addition, an added amount of these special pigments is preferably in the range of 1 to 5 parts by weight per 100 parts by weight of the synthetic resin. If the added amount is less than 1 part by weight, the sheet-like body tends to be difficult to be a dark color in the visible region. In contrast, if the added amount exceeds 5 parts by weight, light reflection properties of the obtained sheet-like body in the near-infrared region tends to be impaired due to increase in solar radiation absorption amount in the near-infrared region.

A formulated composition for forming such a surface layer (A) can be prepared by a method similar to that for forming the formulated composition for forming the reflection layer (B) as described above.

The dark color sheet-like body of the present invention comprises the surface layer (A) and the reflection layer (B) as described above. In addition, the dark color sheet-like body of the present invention can be obtained by laminating the surface layer (A) and the reflection layer (B).

For a method of laminating the surface layer (A) and the reflection layer (B) as described above, various methods can be selected. For example, first, the reflection layer (B) may be formed into a sheet-like body, and the surface layer (A) may be directly formed on one surface of the reflection layer (B) to form a multilayer structure. In contrast, first, the surface layer (A) may be formed, and the reflection layer (B) may be laminated on one surface of the surface layer (A). Moreover, both layers may be formed into sheet-like bodies in advance and may be laminated by an adhesive or heating. Furthermore, a third layer such as other substrate may be placed between both layers.

Meanwhile, for example, suppose that both the surface layer (A) and the reflection layer (B) are formed of a polyvinyl chloride-based resin paste plastisol, and then directly laminated. The surface layer (A) (or the reflection layer (B)) is coated on a release paper or film in a predetermined thickness by any methods, and then solidified by heating. Thereafter, the reflection layer (B) (or the surface layer (A)) is coated again in a predetermined thickness by any methods, and then solidified by heating. The laminated sheet-like body can be formed by being peeled off from the release paper or the film. A layer structure of direct lamination of both layers is most preferable from the viewpoint of functionality and manufacturing, and this is not limited to a polyvinyl chloride resin.

By laminating the surface layer (A) and the reflection layer (B) by these technique, it is possible to obtain a sheet-like body having a high reflection ratio in the near-infrared region contributing to heat generation among wavelengths composing whole sunlight, exhibiting a dark color due to a high absorption ratio of the surface layer (A) in the visible region, and having a structure not dazzling humans.

In addition, for a dark color sheet-like body of the present invention, although varying depending on applications thereof, the thickness of the reflecting layer (B) is preferably in the range of 0.1 to 1 mm, and more preferably in the range of 0.4 to 1 mm from the viewpoint of achieving the above-mentioned properties effectively. If the thickness of the reflecting layer (B) exceeds the above-mentioned upper limit, the reflection layer (B) tends to cause problems of not only increasing the manufacturing cost, but also the whole sheet weight becoming heavy. In contrast, if the thickness is less than 0.1 mm, the reflection layer (B) tends to be difficult to ensure a sufficient solar radiation reflection ratio. Moreover, the thickness of the surface layer (A) is preferably in the range of 0.1 to 0.5 mm. If the thickness exceeds 0.5 mm, it is difficult to ensure a solar radiation absorption ratio of less than 30% and maintain a solar radiation transmission ratio of 50% or more in the near infrared region. As a result, heat is stored in the surface layer (A), deteriorating the heat reflection properties of the laminated sheet-like body. Therefore, the surface layer (A) with a thickness exceeding 0.5 mm is not preferable.

The sheet-like body of the present invention can be used for automotive interior materials, seats for transport equipment, furniture and membrane structure bodies by any means. When the sheet-like body is used for automotive interior materials, such as an instrument panel, a door panel and a glove compartment for automobiles, the sheet-like body is formed by a method including vacuum molding, press molding and the like for use as a surface materials. When being used for seats for transport equipment, seat surface materials of furniture and the like, the sheet-like body is used by combining with a foamed polyurethane core material by mold forming or sewing and hanging forming. On the other hand, for membrane structure bodies such as tents, an membrane structure is obtained in the following way. A tarpaulin is formed by laminating the sheet-like body of the present invention and a fabric structure so that the surface layer (A) of the sheet-like body faces the outside. Then, the tarpaulin is welding-processed or sewed. This membrane structure can be used as a membrane structure body by covering the membrane structure to skeletons such as a frame.

For the dark color sheet-like body of the present invention, an antifouling layer may be provided at the outermost surface as needed. The antifouling layer can be formed by applying an antifouling paint composed of a solvent-based paint, a water-based paint or an ultraviolet curing type paint, in consideration of not affecting the visible light absorption properties and the near-infrared light reflection properties. These properties are the purpose of the present invention.

Examples of the solvent-based paints used herein among such antifouling paints include paints such as acrylic resin-based paints, polyvinyl chloride resin-based paints, cellulose resin-based paints, fluorocarbon resin-based paints, polyamide resin-based paints, urethane resin-based paints, epoxy resin-based paints and silicone resin-based paints.

In addition, examples of the water-based paints used herein among such antifouling paints include paints such as acrylic resin-based paints, polyester resin-based paints, urethane resin-based paints and epoxy resin-based paints.

Moreover, examples of the ultraviolet curing type paints used herein among such antifouling paints include paints such as acrylic resin-based paints, acrylic-modified urethane resin-based paints, acrylic-modified epoxy resin-based paints, mercapto derivative-based paints and epoxy resin-based paints and the like.

In addition, in order to add design to the surface layer (A), the dark color sheet-like body of the present invention is subjected to grain finish. Such grain finish can be achieved by the same method of grain finish as that for obtaining common synthetic leather including grain finish using an emboss roll, a release paper and the like.

In addition, for the dark color sheet-like body of the present invention, a fabric substrate of a woven cloth, a nonwoven cloth or the like may be provided on the back surface of the reflection layer (B). The fabric substrate may be laminated using an adhesive agent on a reflection layer (B) side of the laminated body which is formed of a reflection layer (B) and a surface layer (A) on a release paper. Alternatively, the reflection layer (B) may be formed on the fabric substrate by impregnating the fabric substrate with a resin composition to be a reflection layer (B) and the like. Particularly, such a structure is preferable as a seat surface material for a bench and the like. In addition, another resin layer may be provided on the back surface of the surface layer (A), the reflection layer (B) and the fabric substrate layer (fabric substrate layer side) to form multiple layer structure. Particularly, such a structure is preferable as a sheet-like body for a membrane structure body such as a tent. Moreover, for retaining shape after vacuum forming, a plastic core material such as ABS, foamed polyethylene and foamed polypropylene may also be laminated on the back surface of a reflection layer (B) side in a similar way. Particularly, such a structure is preferable as a molding application of an instrument panel.

As described above, by providing the dark color sheet-like body of the present invention with the fabric substrate or a core material made of plastics, shape retention property, tear strength and tensile strength of the dark color sheet-like body are increased, and durability and processability in use are improved.

EXAMPLES

The present invention will be specifically described below based on Examples and Comparative Examples, but the present invention is not limited to following Examples. In Examples and Comparative Examples, following substances are used as resins, pigments, fillers and various additives.
Polyvinylchloride-based resin 1: "PX-QHPN", manufactured by Shin Dai-Ichi Vinyl Corporation.
Polyvinyl chloride-based resin 2: "PSH-23", manufactured by Kaneka Corporation.
Thermoplastic olefin-based elastomer resin 1: "Milastomer N-8030", manufactured by Mitsui Chemicals, Inc.
Urethane-based resin 1: "Resamine NE-8875", manufactured by Dainichiseika Color & Chemicals Mfg. Co., Ltd.
Plasticizer: Diisononyl phthalate, manufactured by Sekisui Chemical Co., Ltd.
Stabilizer 1: "AC-183", manufactured by Asahi Denka Co., Ltd.
Stabilizer 2: "AO-60", manufactured by Asahi Denka Co., Ltd.
Filler 1: Hollow glass balloon, "CEL-STAR Z27", manufactured by Asahi Glass Co., Ltd.
Filler 2: Ceramic balloon, "E-SPHERES", manufactured by Taiheiyo Cement Corporation.
Pigment 1: Titanium oxide-based white pigment, "JR600A", manufactured by Tayca Corporation.
Pigment 2: Titanium oxide-based white pigment, "JR1000", manufactured by Tayca Corporation.
Pigment 3: Brown pigment: "Brown FT-9000", manufactured by Fuji Pigment Co., Ltd.
Pigment 4: Black pigment: "DPF-T-7939", manufactured by Resino Color Industry Co., Ltd.
Pigment 5: Black pigment: "Pariogen Black S0084" manufactured by BASF SE.
Pigment 6: Black pigment: "Black FT-10", manufactured by Tokushiki Co. Ltd.
Pigment 7: Black pigment: "ARCTIC Black 10C909", manufactured by Shepherd Japan Inc.
Pigment 8: Blackpigment: "ARCTIC Black 411", manufactured by Shepherd Japan Inc.

Preparation Examples and Production Examples (I) Preparation of Paste Plastisols and Compositions for Forming Paste plastisols and compositions for forming were each prepared by mixing a resin, a pigment, a filler and various additives in a composition described in Table 1 and Table 2.

Specifically, a filler, a pigment, a plasticizer (diisononyl phthalate) and heat stabilizer were incorporated into an emulsion polymerized polyvinyl chloride (PX-QHPN: manufactured by Shin Dai-Ichi Vinyl Corporation) in a composition described in Table 1 or Table 2, and the mixture was uniformly mixed with a dissolver mixer to prepare each of the paste plastisols for forming reflection layers (B1 to B6) and surface layers (A1 to A7).

In addition, a stabilizer (antioxidant) and a pigment are dry-blended with an olefin-based thermoplastic elastomer (Milastomer N8030: manufactured by Mitsui Chemicals, Inc.) in compositions described in Table 1 and Table 2 to prepare the compositions for forming surface layers (A8 and A9) and reflection layer (B7).

In addition, ethyl acetate was added as a solvent to the polyurethane-based resin (Resamine NE-8875: manufactured by Dainichiseika Color & Chemicals Mfg. Co., Ltd.) which is a polymer of a polycarbonate diol and an isocyanate, then a filler and a pigment were incorporated into the resin in compositions described in Table 1 and Table 2, and the mixture was uniformly mixed with a dissolver mixer to prepare the compositions for forming a surface layers (A10) and a reflection layer (B8).

(II) Production of Single Layer Sheet and Evaluation of Radiation Properties Thereof In order to evaluate radiation properties of the surface layers and reflection layers, single layer sheets of surface layers (A1 to A10) and reflection layers (B1 to B8) were produced as described below. Then, solar radiation properties (a solar radiation absorption ratio, a solar radiation transmission ratio and a solar radiation reflection ratio) of the obtained single layer sheets were evaluated as described below.
(i) Production of Single Layer Sheet The paste plastisols for forming reflection layers (B1 to B6) and surface layers (A1 to A7) obtained in preparation examples were coated on release papers by knife coating in the thicknesses described in Table 1 and Table 2, and the coated substances were heated at 140° C. for 2 minutes, and then 195° C. for 3 minutes. Then, after cooling, the release papers were peeled off to produce single layer sheets of the reflection layers (B1 to B6) and surface layers (A1 to A7).

In addition, the compositions for forming surface layers (A8 and A9) and a reflection layer (B7) obtained in preparation examples were extruded with a T-die extruder in the thicknesses described in Table 1 and Table 2 to produce single layer sheets of the surface layers (A8, A9) and reflection layers (B7).

Moreover, the compositions for forming a surface layer (A10) and a reflection layer (B8) obtained in preparation examples were coated on release papers by knife coating in the thicknesses described in Table 1 and Table 2, and the coated substances were dried by heated air at 80° C. Then, after cooling, the release papers were peeled off to produce single layer sheets of the surface layer (A10) and the reflection layer (B8).

Colors of obtained single sheets of the reflection layers (B1 to B8) and surface layers (A1 to A10) are listed in Table 1 and Table 2.

(ii) Evaluation of Solar Radiation Properties

Solar radiation properties (a solar radiation absorption ratio, a solar radiation transmission ratio and a solar radiation reflection ratio) of each of the single sheets of the reflection layers (B1 to B8) and surface layers (A1 to A10) obtained in production examples were evaluated by following methods. First, the single layer sheet obtained in production example were used as sample to measure reflection ratios thereof in each wavelength (spectral reflection factor) using a self-recording spectrophotometer U-4000 (manufactured by Hitachi, Ltd.) with the refraction ratio of an alumina white substrate taken as 100% reflection. Then, using JIS A5759 appendix table 3, the solar radiation reflection ratio was derived by calculating sum of values each of which is obtained by multiplying the spectral reflection factor by a weighting factor for the corresponding wavelength (a test method for spectrophotometric solar radiation reflection ratio).

Then, the single layer sheets obtained in production examples were used as samples to measure transmission ratios thereof in each wavelength (spectral transmission factors) using a self-recording spectrophotometer U-4000 (manufactured by Hitachi, Ltd.) with a transmission ratio in a state of not placing a sample taken as 100%. Then, using JIS A5759 appendix table 3, the solar radiation transmission ratios were derived by calculating sum of values each of which is obtained by multiplying the spectral transmission factor by a weighting factor for the corresponding wavelength.

Then, solar radiation absorption ratios were derived from the following equation:

(Solar radiation absorption ratio)=100%−(Solar radiation reflection ratio)−(Solar radiation transmission ratio)

using the obtained solar radiation reflection ratios and solar radiation transmission ratios.

For each of the single layer sheets of the reflection layers (B1 to B8), the solar radiation reflection ratio in a wavelength region of 380 to 1500 nm was evaluated. The obtained results are listed in table 1. In addition, for each of the single layer sheets of the reflection layers (A1 to A10), the solar radiation absorption ratio, the solar radiation transmission ratio and the solar radiation reflection ratio in a wavelength region of 380 to 720 nm, and the solar radiation absorption ratio, the solar radiation transmission ratio and the solar radiation reflection ratio in a wavelength region of 720 to 1500 nm were evaluated. The obtained results are listed in Table 2.

TABLE 1

| Reflection layer (B) | B1 | B2 | B3 | B4 | B5 | B6 | B7 | B8 |
|---|---|---|---|---|---|---|---|---|
| <Formulation> Unit: Parts by weight | | | | | | | | |
| Polyvinyl chloride-based resin 1 | 100 | 100 | 100 | 100 | 100 | 100 | — | — |
| Thermoplastic olefin-based elastomer resin 1 | — | — | — | — | — | — | 100 | — |
| Urethane-based resin 1 | — | — | — | — | — | — | — | 100 |
| Plasticizer | 70 | 70 | 70 | 70 | 70 | 70 | — | — |
| Stabilizer 1 | — | — | — | — | — | — | — | — |
| Stabilizer 2 | 3 | 3 | 3 | 3 | 3 | 3 | 3 | — |
| Filler 1 | — | — | — | — | — | — | — | — |
| Filler 2 | 15 | — | 15 | — | — | — | — | 10 |
| Pigment 1 | 15 | 50 | 15 | — | — | — | 15 | 25 |
| Pigment 2 | — | — | 15 | 2 | 15 | — | — | — |
| Pigment 3 | — | — | — | — | — | 15 | — | — |
| Solvent (Ethyl acetate) | — | — | — | — | — | — | — | 30 |
| <Properties of single layer sheet> | | | | | | | | |
| Color | White | White | White | White | White | Brown | White | White |
| Thickness (mm) | 0.4 | 0.4 | 0.4 | 0.4 | 0.1 | 0.4 | 0.4 | 0.1 |
| Solar radiation reflection ratio in 380 to 1500 nm (%) | 90 | 93 | 96 | 40 | 65 | 40 | 92 | 90 |

TABLE 2

| Surface layer (A) | A1 | A2 | A3 | A4 | A5 | A6 | A7 | A8 | A9 | A10 |
|---|---|---|---|---|---|---|---|---|---|---|
| <Formulation> Unit: Parts by weight | | | | | | | | | | |
| Polyvinyl chloride-based resin 2 | 100 | 100 | 100 | 100 | 100 | 100 | 100 | — | — | — |
| Thermoplastic olefin-based elastomer resin 1 | — | — | — | — | — | — | — | 100 | 100 | — |
| Urethane-based resin 1 | — | — | — | — | — | — | — | — | — | 100 |
| Plasticizer | 70 | 70 | 70 | 70 | 70 | 70 | 70 | — | — | — |
| Stabilizer 1 | 3 | 3 | 3 | 3 | 3 | 3 | 3 | — | — | — |
| Stabilizer 2 | — | — | — | — | — | — | — | 3 | 3 | — |
| Pigment 1 (JR-600A) | — | — | — | — | — | — | — | — | — | — |
| Pigment 2 (JR-1000) | — | — | — | — | 5 | — | — | — | — | — |
| Pigment 3 (FT-9000) | — | — | — | 3 | — | — | — | — | — | — |
| Pigment 4 (DPF T-7939) | 5 | — | — | — | — | — | — | — | — | — |

TABLE 2-continued

| Surface layer (A) | A1 | A2 | A3 | A4 | A5 | A6 | A7 | A8 | A9 | A10 |
|---|---|---|---|---|---|---|---|---|---|---|
| Pigment 5 (S-0084) | — | 3 | — | — | — | — | — | 5 | — | 10 |
| Pigment 6 (FT-10) | — | — | 3 | — | — | — | — | — | 5 | — |
| Pigment 7 (Arctic Black) | — | — | — | — | — | 5 | — | — | — | — |
| Pigment 8 (Arctic Black) | — | — | — | — | — | — | 5 | — | — | — |
| Solvent (Ethyl acetate) | — | — | — | — | — | — | — | — | — | 30 |
| <Properties of single layer sheet> | | | | | | | | | | |
| Color | Black | Black | Black | Brown | White | Black | Black | Black | Black | Black |
| Thickness (mm) | 0.15 | 0.15 | 0.15 | 0.15 | 0.15 | 0.15 | 0.15 | 0.15 | 0.15 | 0.10 |
| Solar radiation absorption ratio in 380-720 nm (%) | 95 | 92 | 98 | 60 | 4 | 93 | 93 | 95 | 98 | 93 |
| Solar radiation transmission ratio in 380-720 nm (%) | 1 | 3 | 1 | 15 | 11 | 3 | 2 | 0 | 0 | 2 |
| Solar radiation reflection ratio in 380-720 nm (%) | 4 | 5 | 1 | 35 | 85 | 4 | 5 | 5 | 2 | 5 |
| Solar radiation absorption ratio in 720-1500 nm (%) | 20 | 22 | 97 | 65 | 7 | 50 | 46 | 21 | 97 | 22 |
| Solar radiation transmission ratio in 720-1500 nm (%) | 70 | 72 | 1 | 8 | 10 | 1 | 2 | 72 | 1 | 73 |
| Solar radiation reflection ratio in 720-1500 nm (%) | 10 | 6 | 2 | 27 | 83 | 49 | 52 | 7 | 2 | 5 |

Examples and Comparative Examples

The paste plastisols for forming surface layers (A1 to A7) obtained in preparation examples were coated on release papers by knife coating in the layer compositions and thicknesses described in Table 3 and Table 4, and the coated substances were heated at 140° C. for 2 minutes. Then, the paste plastisols for forming the reflection layers (B1 to B6) obtained in preparation examples were coated on the surface layers by knife coating in the layer compositions and thicknesses described in Table 3 and Table 4, and the coated substances were heated at 195° C. for 3 minutes. Then, after cooling, the release papers were peeled off to prepare multilayer sheets (Examples 1 to 6 and Comparative Examples 1 to 10).

In addition, the compositions for forming the surface layers (A8 and A9) and the reflection layer (B7) obtained in preparation examples were co-extruded with a T-die extruder for two layers of two-type materials capable of varying a layer thickness ratio in the layer compositions and thicknesses described in Table 3 and Table 4 to produce multilayer sheets (Example 7 and Comparative Example 11).

Moreover, the composition for forming the surface layer (A10) obtained in the preparation example was coated on a release paper by knife coating in the layer composition and thickness described in Table 3, and the coated substance is dried by a heated air at 80° C. Then, the composition for forming the reflection layer (B8) obtained in the preparation example was coated on the surface layer by knife coating in the layer composition and thickness described in Table 3, and the coated substance was dried by a heated air at 80° C. After cooling, the release paper was peeled off to produce a multilayer sheet (Example 8).

Surface colors and thicknesses of the multilayer sheets obtained in Examples 1 to 8 and the multilayer sheets obtained in Comparative Examples 1 to 11 are listed in Table 3 or Table 4.

<Evaluation of Solar Radiation Properties, Heat Shielding Properties and Dazzling Properties of Multilayer Sheets>
(I) Evaluation Method Heat shielding properties and dazzling properties of the multilayer sheets were evaluated by the following methods. In addition, solar radiation properties of the multilayer sheets were evaluated by the same methods as those used for solar radiation properties of single layer sheets.

(i) Evaluation of Heat Shielding Properties (Test of Temperature Rise Due to Sunlight Exposure)

Each of the multilayer sheets obtained in the Examples and Comparative Examples was cut into the same size as that of a steel plate of width of 200 mm, length of 300 mm and thickness of 0.3 mm and attached onto the steel plate to obtain a sample. On a bottom surface of a box (height 150 mm, width 240 mm and length 340 mm) whose top surface was opened, and which was made of foamed-polystyrene having 30 mm thickness, the sample was mounted. After a soda glass plate having 1.5 mm thickness was placed on the top surface of the box, the sample was exposed to sunlight on clear and sunny day in August in North Kanto (a region of Japan) while temperature of the sheet surface in the box was measured with a thermocouple. Then, temperature rise at the sheet surface was observed, and a difference between a temperature at which the temperature rise did not occur any more and a temperature in a shaded area at that time was recorded as ΔT (° C.).

(ii) Evaluation of Dazzling Properties

Each of the multilayer sheets obtained in the Examples and Comparative Examples was cut into the same size as that of a steel plates of width of 200 mm, length of 300 mm and thickness of 0.3 mm, and attached onto the steel plate to obtain a sample. Then, under a clear and sunny weather, the sample was observed by the naked eye from a distance of 1 m while inclined at 45 degrees, and whether the sample was dazzling or not was evaluated by the following criteria.
A: Reflection was not felt, and the sample was not dazzling.
B: Reflection was hardly felt, but a long period observation caused tiredness.
C: The sample was dazzling because of light reflection.
D: Reflection was strongly felt, so that the samples could not be seen for a long period.

(II) Evaluation Results

Solar radiation properties, heat shielding properties and dazzling properties of the multilayer sheets obtained in Examples 1 to 8 and multilayer sheets obtained in Comparative Examples 1 to 11 were evaluated. As for solar radiation properties, the solar radiation absorption ratio, the solar radiation transmission ratio and the solar radiation reflection ratio in a wavelength region of 380 to 720 nm, and the solar radiation absorption ratio, the solar radiation transmission ratio and the solar radiation reflection ratio in a wavelength region of 720 to 1500 nm were evaluated for each sheet. The obtained results are listed in Table 3 or Table 4.

In contrast, for the multilayer sheets obtained in Comparative Examples 1 and 11, since a common carbon black based black pigment was used in the surface layer (A), light in the near-infrared region as well as light in the visible region were

TABLE 3

| Example | 1 | 2 | 3 | 4 | 5 | 6 | 7 | 8 |
|---|---|---|---|---|---|---|---|---|
| <Layer composition of multiple layer sheet> | | | | | | | | |
| Surface layer (A) | A1 | A2 | A1 | A1 | A2 | A2 | A8 | A10 |
| Thickness (mm) | 0.15 | 0.15 | 0.15 | 0.15 | 0.15 | 0.15 | 0.15 | 0.10 |
| Reflection layer (B) | B1 | B1 | B2 | B3 | B2 | B3 | B7 | B8 |
| Thickness (mm) | 0.4 | 0.4 | 0.4 | 0.4 | 0.4 | 0.4 | 0.4 | 0.1 |
| <Properties of multi layer sheet> | | | | | | | | |
| Surface color | Black | Black | Black | Black | Black | Black | Black | Black |
| Thickness (mm) | 0.55 | 0.55 | 0.55 | 0.55 | 0.55 | 0.55 | 0.55 | 0.20 |
| Solar radiation absorption ratio in 380-720 nm (%) | 96 | 95 | 96 | 96 | 95 | 95 | 93 | 94 |
| Solar radiation transmission ratio in 380-720 nm (%) | 0 | 0 | 0 | 0 | 0 | 0 | 0 | 0 |
| Solar radiation reflection ratio in 380-720 nm (%) | 4 | 5 | 4 | 4 | 5 | 5 | 7 | 6 |
| Solar radiation absorption ratio in 720-1500 nm (%) | 25 | 20 | 23 | 23 | 20 | 19 | 25 | 26 |
| Solar radiation transmission ratio in 720-1500 nm (%) | 0 | 0 | 0 | 0 | 0 | 0 | 0 | 0 |
| Solar radiation reflection ratio in 720-1500 nm (%) | 75 | 80 | 77 | 77 | 80 | 81 | 75 | 74 |
| dazzling properties | A | A | A | A | A | A | A | A |
| Temperature rise due to sunlight exposure (° C.) | 43 | 39 | 40 | 40 | 39 | 38 | 45 | 44 |

TABLE 4

| Comparative example | 1 | 2 | 3 | 4 | 5 | 6 | 7 | 8 | 9 | 10 | 11 |
|---|---|---|---|---|---|---|---|---|---|---|---|
| <Layer composition of multiple layer sheet> | | | | | | | | | | | |
| Surface layer (A) | A3 | A1 | A1 | A4 | A5 | A1 | A6 | A6 | A6 | A7 | A9 |
| Thickness (mm) | 0.15 | 0.15 | 0.15 | 0.15 | 0.15 | 0.15 | 0.15 | 0.15 | 0.15 | 0.15 | 0.15 |
| Reflection layer (B) | B1 | B4 | B5 | B1 | B1 | B6 | B1 | B5 | B6 | B1 | B7 |
| Thickness (mm) | 0.4 | 0.4 | 0.1 | 0.4 | 0.4 | 0.4 | 0.4 | 0.1 | 0.4 | 0.4 | 0.4 |
| <Properties of multi layer sheet> | | | | | | | | | | | |
| Surface color | Black | Black | Black | Brown | White | Black | Black | Black | Black | Black | Black |
| Thickness (mm) | 0.55 | 0.55 | 0.25 | 0.55 | 0.55 | 0.55 | 0.55 | 0.25 | 0.55 | 0.55 | 0.55 |
| Solar radiation absorption ratio in 380-720 nm (%) | 98 | 94 | 95 | 62 | 8 | 96 | 94 | 94 | 93 | 92 | 98 |
| Solar radiation transmission ratio in 380-720 nm (%) | 0 | 1 | 0 | 0 | 8 | 0 | 0 | 0 | 0 | 0 | 0 |
| Solar radiation reflection ratio in 380-720 nm (%) | 2 | 5 | 5 | 38 | 84 | 4 | 6 | 6 | 7 | 8 | 2 |
| Solar radiation absorption ratio in 720-1500 nm (%) | 98 | 72 | 56 | 60 | 9 | 90 | 51 | 50 | 45 | 48 | 98 |
| Solar radiation transmission ratio in 720-1500 nm (%) | 0 | 8 | 13 | 2 | 10 | 3 | 0 | 7 | 0 | 0 | 0 |
| Solar radiation reflection ratio in 720-1500 nm (%) | 2 | 20 | 31 | 38 | 82 | 7 | 49 | 43 | 55 | 52 | 2 |
| dazzling properties | A | A | A | C | D | A | A | A | A | A | A |
| Temperature rise due to sunlight exposure (° C.) | 65 | 63 | 60 | 61 | 38 | 62 | 59 | 57 | 58 | 56 | 64 |

As is apparent from the results listed in Table 3 and Table 4, in the dark color sheet-like bodies (Examples 1 to 8) of the present invention, it was observed that the samples were not dazzling because the surface layer (A) absorbed a lot of light in the visible region and that temperature rise at the sheets surfaces at the time of sunlight exposure was low because the sheet reflected a lot of light in the near infrared region.

absorbed. As a result, it was observed that temperatures at sheets surfaces rose when the samples were exposed to sunlight.

In addition, for the multilayer sheets obtained in Comparative Examples 2, 3 and 6, although the surface layers (A) absorbed light in the visible region and transmitted light in the near-infrared region with high ratio, the reflection ratios of the reflection layers (B) were not sufficient, so that the light transmitted through the surface layers (A) was not be reflected effectively. As a result, it was observed that temperatures at sheet surface rose when the samples were exposed to sunlight.

Moreover, for the multilayer sheet obtained in Comparative Example 4, although dazzling properties are slightly reduced because the surface layer (A) absorbed light in the visible region to some degree, it was observed that temperature at the sheet surface also rose when the sample was exposed to sunlight.

In addition, for the multilayer sheet obtained in Comparative Example 5, although temperature rise at the time of sunlight exposure was suppressed low by placing the reflection layer (B) having a high solar radiation reflection ratio onto the surface layer (A), at the same time, it was observed that the multilayer sheet was glaring for human eyes due to high reflection of light in the visible region.

Moreover, for the multilayer sheets obtained in Comparative Examples 7 and 10, although the surface layers (A) reflected light in the near-infrared region in relatively high ratio, it was observed that temperatures at sheet surface rose at the time of sunlight exposure because absorption of light in the near-infrared region was not sufficiently suppressed.

INDUSTRIAL APPLICABILITY

As described above, according to the present invention, it is possible to provide a dark color sheet-like body having a solar radiation absorption ratio of 90% or more in a visible region of 380 to 720 nm and having excellent heat shielding properties.

The invention claimed is:

1. A dark color sheet-like body having light reflective properties in a near-infrared region and being a synthetic resin sheet-like body,
    the dark color sheet-like body comprising a surface layer (A) receiving solar radiation and a reflection layer (B), wherein
    the surface layer (A) is a layer exhibiting a dark color, and having a solar radiation absorption ratio of 90% or more in a wavelength region of 380 to 720 nm, a solar radiation absorption ratio of less than 30% in a near-infrared region of 720 to 1500 nm, and a solar radiation transmission ratio of 50% or more in a near-infrared region of 720 to 1500 nm,
    the surface layer (A) containing 100 parts by weight of a synthetic resin and 1 to 5 parts by weight of at least one pigment selected from the group consisting of an azo-based pigment, an azomethine azo-based pigment and a perylene-based pigment,
    the reflection layer (B) is a layer having a solar radiation reflection ratio of 85% or more in a wavelength region of 380 to 1500 nm, and
    a solar radiation reflection ratio in a near-infrared region of 720 to 1500 nm of a sheet-like body formed by laminating the surface layer (A) and the reflection layer (B) is 70% or more.

2. The dark color sheet-like body having light reflective properties in a near-infrared region according to claim 1, wherein each of the surface layer (A) and the reflection layer (B) is formed of at least one synthetic resin selected from the group consisting of a polyvinyl chloride-based resin, a polyurethane-based resin and a thermoplastic elastomer-based resin.

3. The dark color sheet-like body having light reflective properties in a near-infrared region according to claim 1, wherein the surface layer (A) and the reflection layer (B) are formed of the same synthetic resin.

4. The dark color sheet-like body having light reflective properties in a near-infrared region according to claim 1, wherein the reflection layer (B) contains 100 parts by weight of a synthetic resin and 3 to 75 parts by weight of a titanium oxide-based white pigment.

5. The dark color sheet-like body having light reflective properties in a near-infrared region according to claim 1, wherein the reflection layer (B) contains 100 parts by weight of a synthetic resin, 3 to 75 parts by weight of a titanium oxide-based white pigment and 5 to 20 parts by weight of at least one filler selected from the group consisting of glass beads, hollow glass balloons and microcapsules.

\* \* \* \* \*